(12) United States Patent
Casoria et al.

(10) Patent No.: US 9,411,151 B2
(45) Date of Patent: Aug. 9, 2016

(54) BANGLE WITH MAGNIFYING LENS AND ILLUMINATION DEVICE

(71) Applicants: Eva Marie Casoria, Thornwood, NY (US); Peter Banyasz, Hollis Hills, NY (US); Marie Geha, Fremont, CA (US)

(72) Inventors: Eva Marie Casoria, Thornwood, NY (US); Peter Banyasz, Hollis Hills, NY (US); Marie Geha, Fremont, CA (US)

( * ) Notice: Subject to any disclaimer, the term of this patent is extended or adjusted under 35 U.S.C. 154(b) by 279 days.

(21) Appl. No.: 14/176,393

(22) Filed: Feb. 10, 2014

(65) Prior Publication Data

US 2015/0226955 A1    Aug. 13, 2015

(51) Int. Cl.
| | |
|---|---|
| *F21V 21/14* | (2006.01) |
| *F21V 33/00* | (2006.01) |
| *G02B 25/00* | (2006.01) |
| *G02B 25/02* | (2006.01) |
| *F21Y 101/02* | (2006.01) |
| *A44C 5/00* | (2006.01) |

(52) U.S. Cl.
CPC .......... *G02B 25/02* (2013.01); *F21V 33/0008* (2013.01); *G02B 25/002* (2013.01); *A44C 5/0007* (2013.01); *F21Y 2101/02* (2013.01)

(58) Field of Classification Search
CPC ...... G02B 7/002; G02B 25/02; G02B 25/002; A44C 9/0076; A44C 5/0007; F21V 33/0008
USPC ......... 362/800–802, 138, 139, 100–104, 187, 362/188, 190
See application file for complete search history.

(56) References Cited

U.S. PATENT DOCUMENTS

| | | | | | |
|---|---|---|---|---|---|
| 4,425,600 | A | * | 1/1984 | Barnhart ................. | H05B 33/00 224/219 |
| 4,521,832 | A | * | 6/1985 | Barbour .................... | F21L 4/00 200/60 |
| 5,754,349 | A | * | 5/1998 | Hon ........................ | G02B 25/02 359/800 |
| 6,082,872 | A | * | 7/2000 | Ting .......................... | F21L 4/00 362/191 |
| 6,540,107 | B1 | * | 4/2003 | Admony ................... | F41H 9/10 222/175 |
| 6,822,813 | B2 | * | 11/2004 | Jim ......................... | G02B 25/02 359/802 |
| 7,218,463 | B1 | * | 5/2007 | Arsenault ............ | G02B 25/002 359/802 |
| 9,170,416 | B2 | * | 10/2015 | Rittenburg ........... | B43K 29/003 359/802 |
| 2012/0212938 | A1 | * | 8/2012 | Nguyen .................. | F21V 21/08 362/104 |
| 2014/0043794 | A1 | * | 2/2014 | Carriere ............. | F21V 33/0008 362/103 |
| 2015/0289227 | A1 | * | 10/2015 | Becker .................. | H04W 68/00 455/41.3 |

* cited by examiner

*Primary Examiner* — Anh Mai
*Assistant Examiner* — Arman B Fallahkhair
(74) *Attorney, Agent, or Firm* — Gerald E. Hespos; Michael J. Porco; Matthew T. Hespos

(57) ABSTRACT

A bangle is provided having a toroidal, tubular or cylindrical main body with at least inner and outer surfaces. A cut-out portion is provided in the main body extending from the outer surface towards the inner surface. A cavity extends at least partially through the main body and communicates with an opening formed in a wall of the cut-out portion. A magnifying lens is removably disposed in the cavity. An end of the magnifying lens is coupled to an illumination housing having an illumination device disposed therein. The illumination housing is configured to be placed in the cut-out section of the main body and substantially complete the shape of the main body. A protrusion is formed on an outer surface of the illumination housing for retracting the magnifying lens and the illumination housing from the cavity and cut-out portion, respectively.

12 Claims, 6 Drawing Sheets

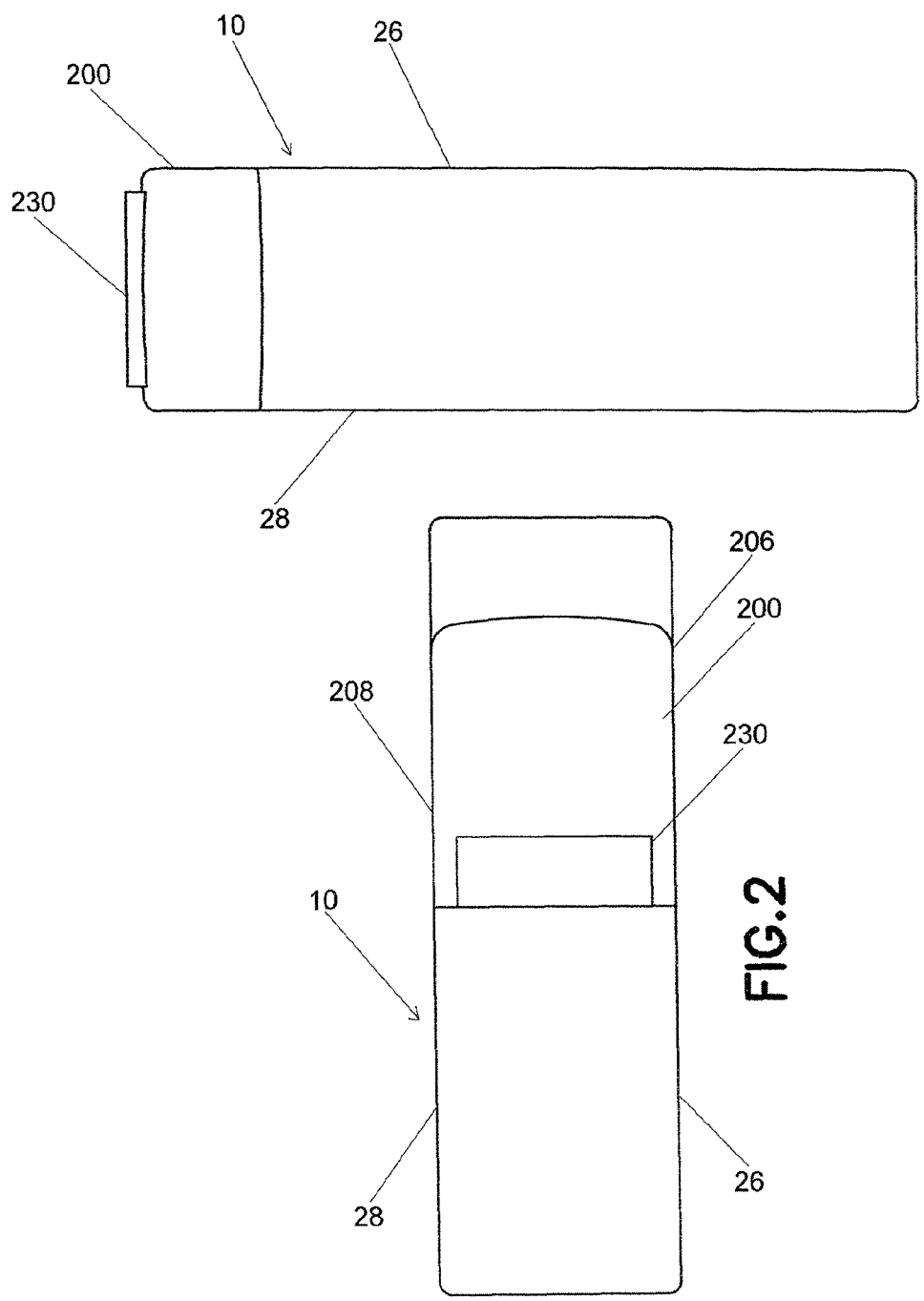

BANGLE WITH MAGNIFYING LENS AND ILLUMINATION DEVICE

BACKGROUND OF THE INVENTION

1. Field of the Invention

This invention relates to a bangle with a magnifying lens and illuminating device.

2. Description of the Prior Art

Reading glasses and magnifying devices are well known in the art. Many people find themselves requiring eyeglasses as they get older, particularly for assistance in reading small print. For instance, a person may require glasses or a magnifying device to read a restaurant menu. A person may also have difficult reading a magazine or newspaper article, a map, or directions on medication packaging.

As vision deteriorates, a person may store a pair of eyeglasses at home and/or at the person's workplace. Thus, the person may not have eyeglasses or a magnifying glass available when away from the home or office. As a result, the person may be forced to rely on a dining companion or server for help reading the menu, ask a stranger for directions, or simply guess the correct dosage of a specific medication. Each of these scenarios could potentially have unfavorable results. Thus, it would be preferable to have a magnifying device that will always be secured to a person's body.

In view of the above, it is an object of the invention to provide a magnifying device retractable from a bangle.

It is a further objection of the invention to provide a bangle with a magnifying lens and an illumination device.

It is a still further objection of the invention to provide fashionable bangle with a magnifying lens that can be worn at all times.

SUMMARY

The invention relates to a bangle with a magnifying lens.

A bangle is provided having a toroidal, tubular or cylindrical main body. The toroidal main body may be generated by rotating a two-dimensional geometric shape about an axis external to the shape. The main body may further have substantially parallel inner and outer surfaces spaced from one another. First and second side surfaces may extend between edges of the inner and outer surfaces. The inner and outer surfaces and first and second side surfaces may contain indicia, such as a brand name, a design pattern, or protrusions to impart aesthetic or promotional characteristics. Alternatively, the inner and outer surfaces and first and second surfaces may have a plain, matte, buffed, or polished finish. The bangle may be any material, including, but not limited to yellow gold, white gold, platinum, silver, sterling silver, titanium, plastic, or rubber.

A cut-out portion is provided in the main body. The cut-out is formed by a first wall parallel to a radius of the main body having a first end at the outer surface and a second end between the outer surface and the inner surface. A second wall extends from the second end of the first wall to the outer surface and substantially normal to the first wall.

A cavity is provided within the main body between the inner and outer surfaces and the first and second side surfaces over at least a portion of a circumference of the bangle. The cavity has a circumferential dimension defined by proximal and distal ends. The proximal end communicates with the first wall of the cut-out section. The cavity may be further defined by a radial dimension between the inner and outer surfaces and a width parallel to the axis about which the bangle is generated and hence between the first and second surfaces. Preferably, the width, or axial dimension, of the cavity is greater than the radial dimension of the cavity. The cavity may be convex when viewed cross-sectionally with the convexity of the cavity facing the outer surface of the bangle.

A magnifying lens is removably disposed in the cavity. The magnifying lens is defined by proximal and distal ends and first and second side edges. The proximal end of the magnifying lens is coupled to an illumination housing having an illumination device disposed therein. The illumination housing is configured to be placed in the cut-out section of the main body and substantially complete the toroidal, tubular, or cylindrical shape of the main body. A protrusion is formed on an outer surface of the illumination housing. The protrusion is preferably a thumb grip that can be engaged to slide the magnifying lens into and out of the cavity. A locking mechanism is formed on the illumination housing for securing the illumination housing to the bangle.

The illumination device is preferably an LED light. A replaceable battery is disposed in the illumination housing for providing power to the illumination device. Alternatively, a charging port may be provided on the illumination housing for charging the battery. In the preferred embodiment, the illumination device is activated by known means when the illumination housing is removed from the cut-out section. However, a switch or button may be provided for activating and deactivating the illumination device.

The magnifying lens is formed from a clear material, such as glass or plastic. Preferably, the magnifying lens is dimensioned to fit snugly inside the cavity to prevent bending, scratching, or other damage during insertion and retraction from the cavity. The magnifying lens may have a convex outer surface facing the outer surface of the bangle. An inner surface opposite the convex surface may be either planar or concave. Alternatively, the magnifying lens may be a substantially planar sheet magnifier, such as a Fresnal lens. The magnifying lens is shaped to provide a predetermined amount of magnification. The magnifying lens is interchangeable with additional magnifying lenses providing varying degrees of magnification.

BRIEF DESCRIPTION OF THE DRAWINGS

FIG. 2 is a top view of the bangle.

FIG. 3 is a front view of the bangle.

DETAILED DESCRIPTION OF THE PREFERRED EMBODIMENT

All examples and conditional language recited herein are intended for teaching purposes to aid the reader in understanding the principles of the disclosure and the concepts contributed by the inventor to furthering the art, and are to be construed as being without limitation to such specifically recited examples and conditions.

Moreover, all statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
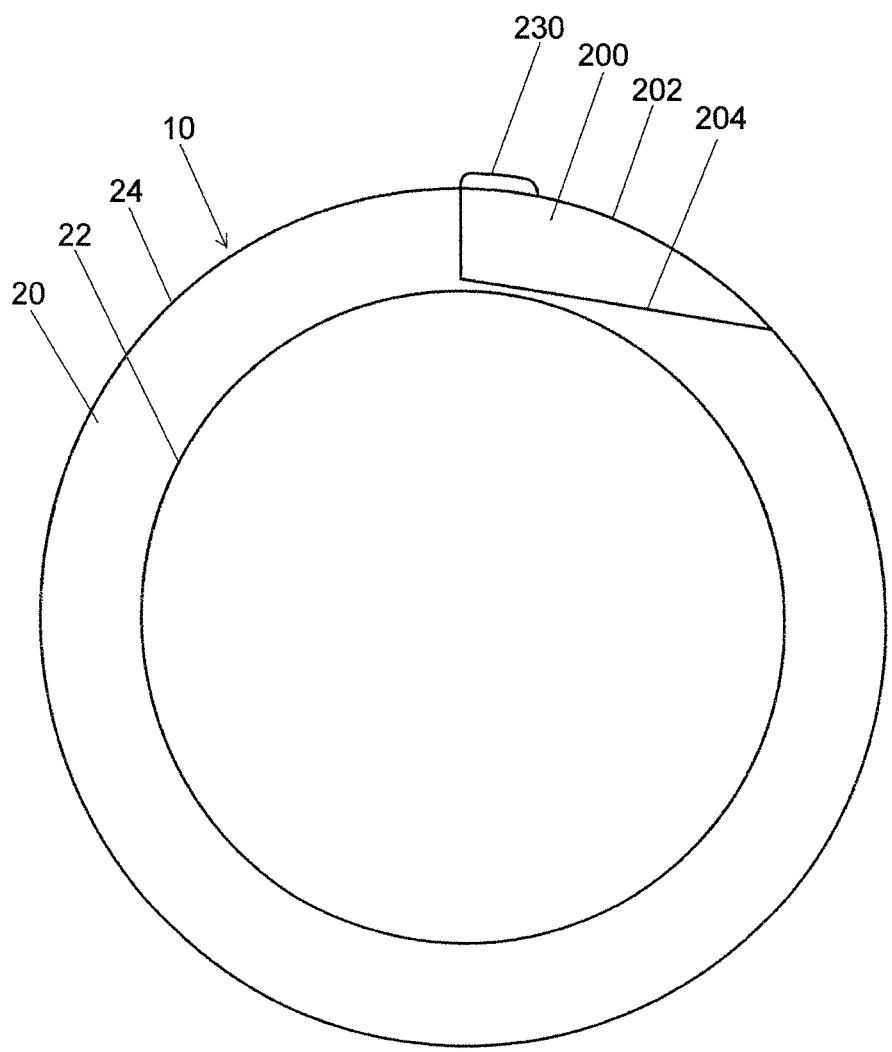
FIG. 1 is a side view of a bangle with a magnifying lens and illumination device.
Figure 4:
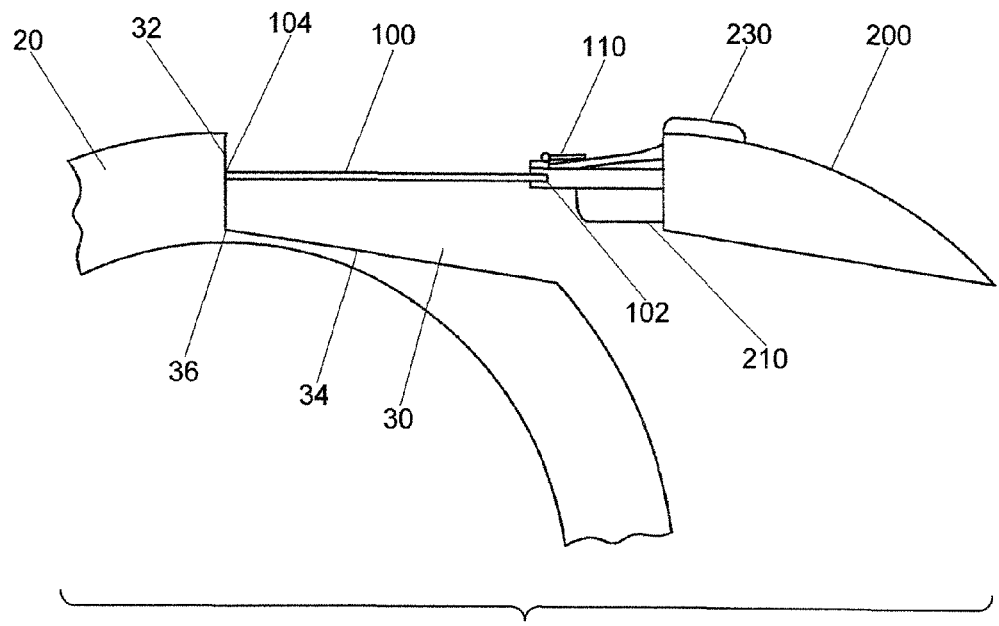
FIG. 4 is a side view of the bangle with the magnifying lens and illumination device retracted from a cavity.
Figure 5:
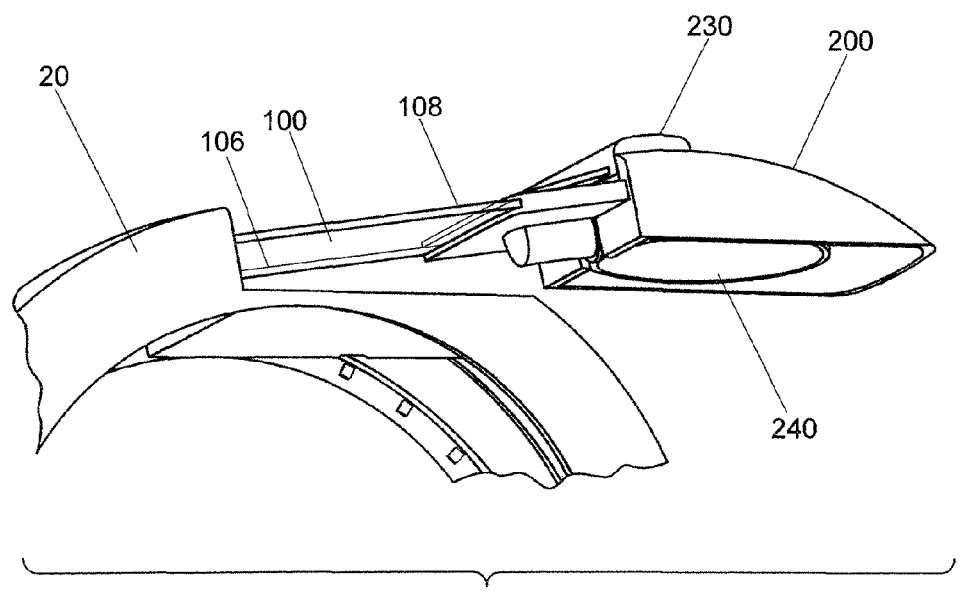
FIG. 5 is a perspective view of the bangle with the magnifying lens and illumination device retracted from the cavity.
Figure 6:
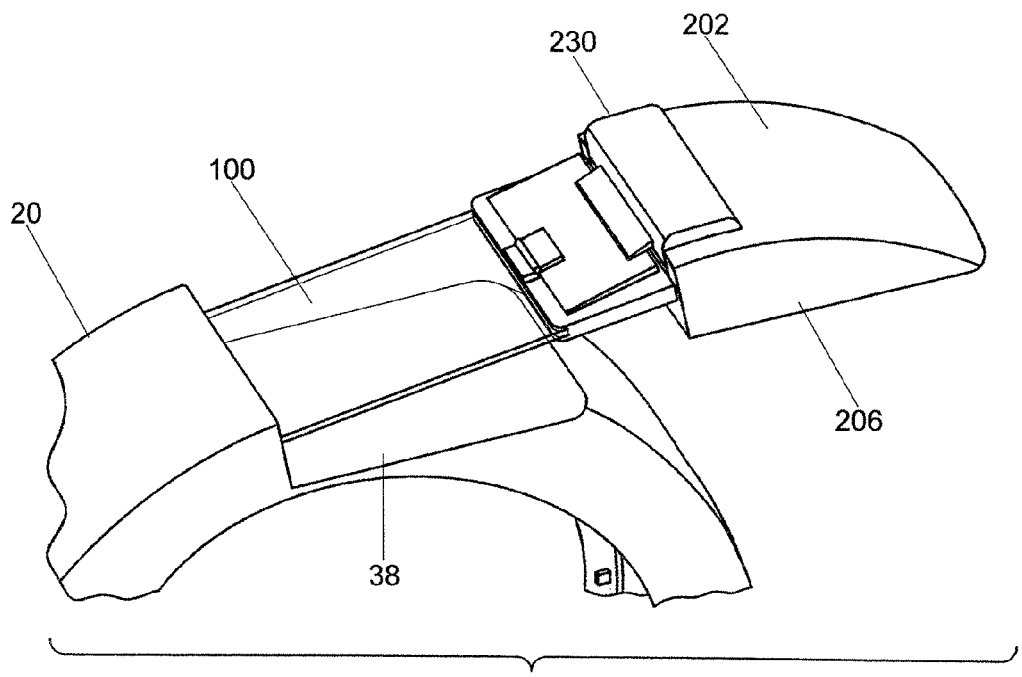
FIG. 6 is a top-perspective view of the bangle with the magnifying lens and illumination device retracted from the cavity as viewed from the left side.
Figure 7:
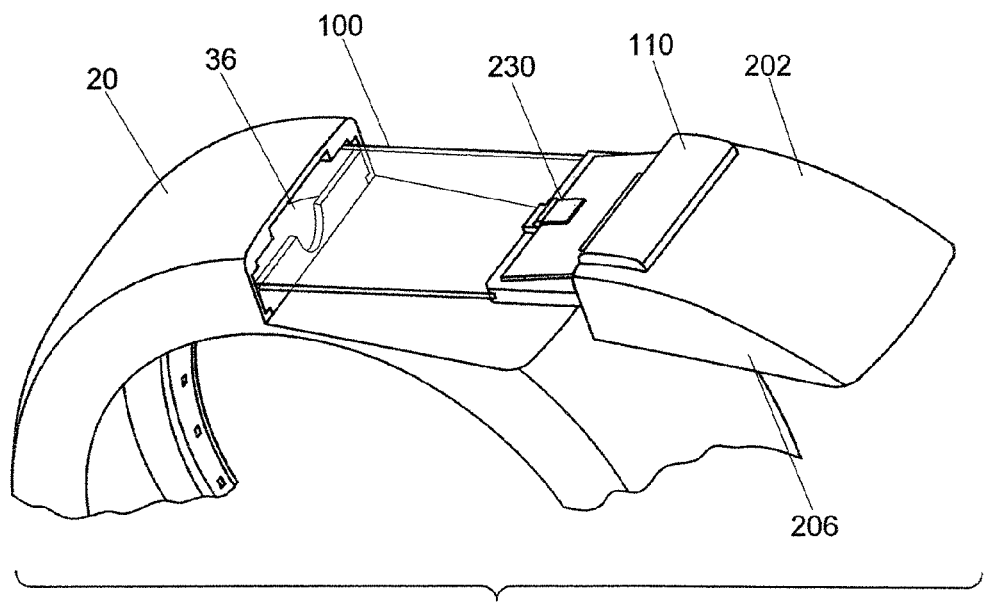
FIG. 7 is a top-perspective view of the bangle with the magnifying lens and illumination device retracted from the cavity as viewed from the right side
Figure 8:
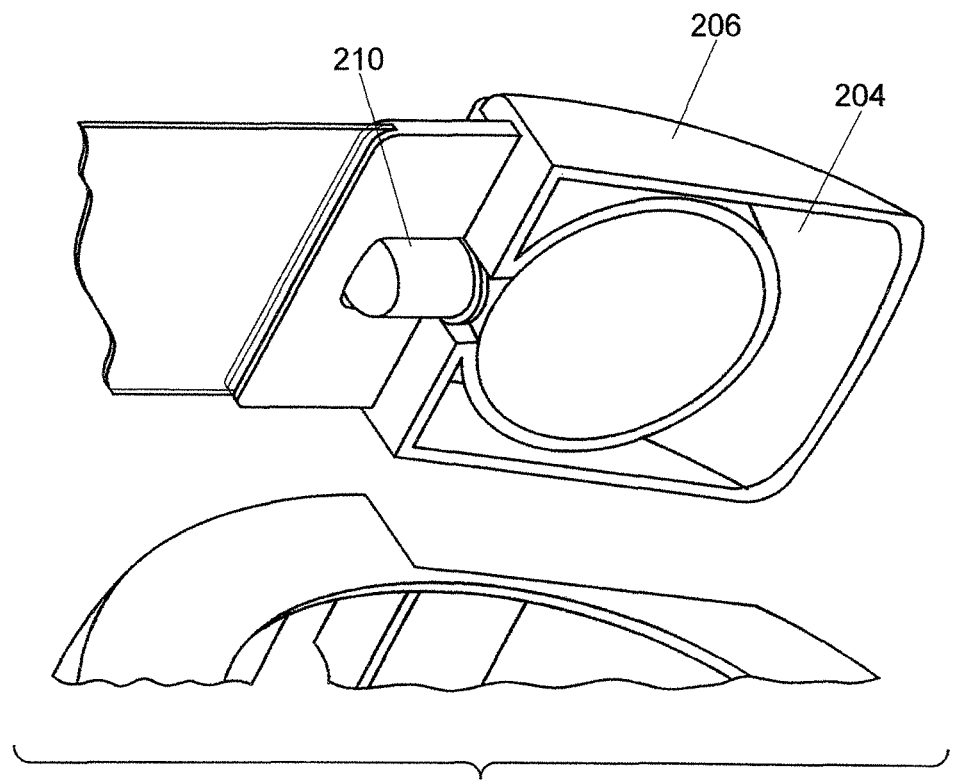
FIG. 8 is a bottom perspective view of the illumination device.
Figure 9:
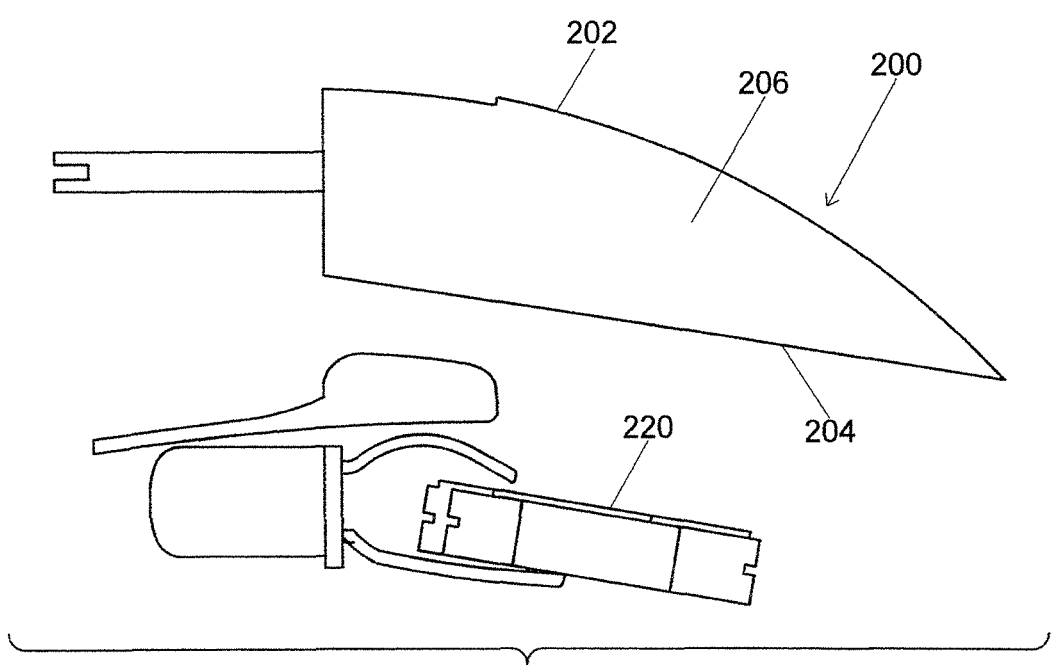
FIG. 9 is a side view of an illuminating device housing and illumination device.
Figure 10:
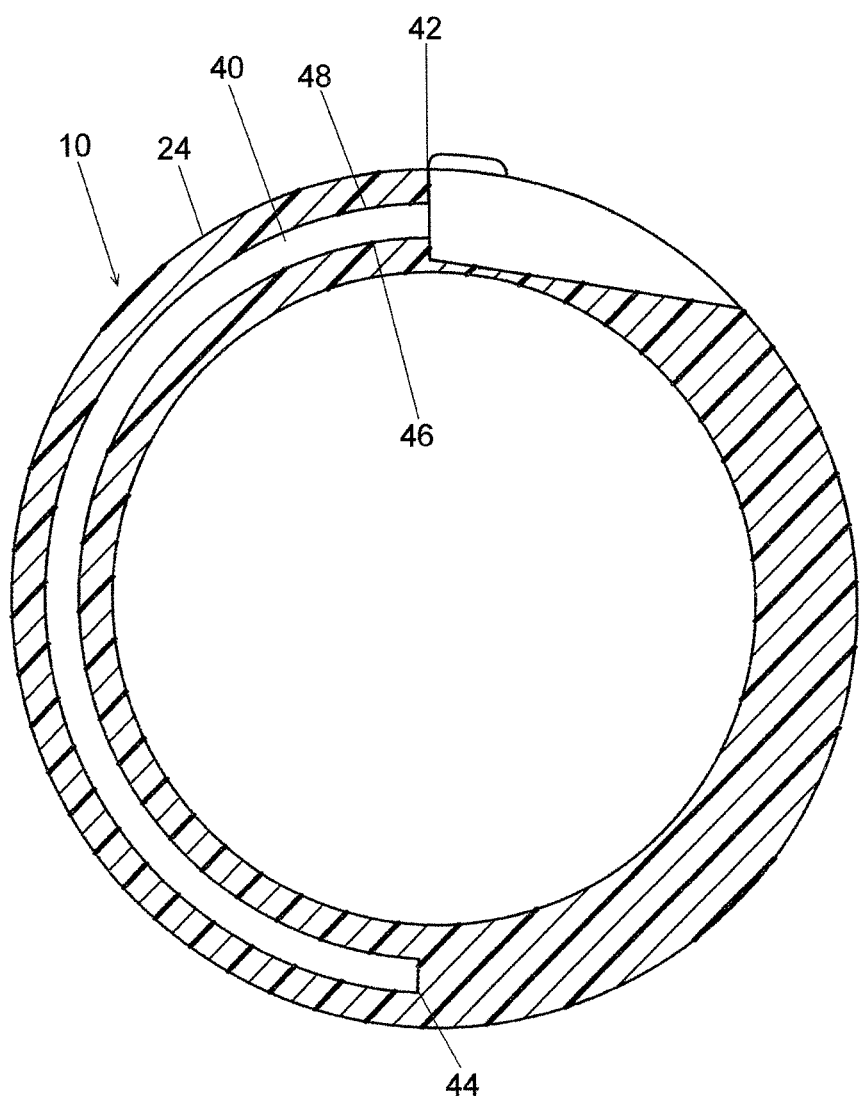
FIG. 10 is a cross-sectional view taken along line 10-10 of FIG. 3.

With reference to the drawings, embodiments of the present disclosure will be described. As shown in FIGS. 1-10, a bangle 10 is provided having a main body 20. The main body 20 may be toroidal, tubular, or cylindrical. The main body 20 has substantially parallel inner and outer surfaces 22, 24 spaced from one another. First and second side surfaces 26, 28 extend between the inner and outer surfaces to define a substantially rectangular cross-section. The first and second side surfaces 26, 28 may be substantially parallel to one another. However, the inner and outer surfaces 22, 24, and the first and second side surfaces 26, 28 may form a substantially trapezoidal or ovoidal cross-section. The inner and outer surfaces 22, 24 and the first and second side surfaces 26, 28 may contain indicia, such as a brand name, a design pattern, or protrusions to impart aesthetic or promotional characteristics. Alternatively, the inner and outer surfaces 22, 24 and the first and second surfaces 26, 28 may have a plain, matte, buffed, or polished finish. The bangle 10 may be any material, including, but not limited to yellow gold, white gold, platinum, silver, sterling silver, titanium, plastic, or rubber.

A cut-out portion 30 is formed in the outer surface 24 of the main body 20. The cut-out portion 30 is formed by a first wall 32 substantially parallel to a radius of the main body 20 having a first end 34 at the outer surface 24 and a second end 36 between the outer surface 24 and the inner surface 22. A second wall 38 extends at a substantially right angle from the second end 36 of the first wall 32 and intersects the outer surface 24 of the main body 20.

A cavity 40 is provided between the inner and outer surfaces 22, 24 and the first and second side surfaces 26, 28, over at least a portion of a circumference of the bangle 10. The cavity 40 has a circumferential dimension defined by proximal and distal ends 42, 44. The proximal end 42 is disposed at or near a slit-like opening 30 in the first wall 32 of the cut out portion 30. The cavity 40 may be further defined by parallel inner and outer surfaces 46, 48 and spaced inward from the inner and outer surfaces 22, 24 of the bangle 10, respectively. The cavity may be convex when viewed cross-sectionally with the convexity of the cavity facing the outer surface of the bangle 10 or the cavity 40 may have a substantially rectangular cross-section.

A magnifying lens 100 is removably disposed in the cavity 40. The magnifying lens 100 is defined by proximal and distal ends 102, 104 and first and second side edges 106, 108. The proximal end 102 of the magnifying lens 100 is coupled to an illumination housing 200 of an illumination device 210. The illumination housing 200 has outer and inner surfaces 202, 204 and first and second side surfaces 206, 208 is configured to be disposed in the cut-out section of the main body and substantially complete the toroidal, tubular, or cylindrical shape of the main body. A protrusion 230 is formed on the outer surface 202 of the illumination housing 200. The protrusion 230 is preferably a thumb grip that can be engaged to slide the magnifying lens 100 into and out of the cavity 40. A locking mechanism 110 is formed on the illumination housing for securing the illumination housing to the bangle. The locking mechanism may be any known locking mechanism and is preferably a box clasp.

The illumination device 210 is preferably an LED light. A replaceable battery 220 is disposed in the illumination housing 200 for providing power to the illumination device 210. A cover 240 is provided for covering the battery 220. In the preferred embodiment, the illumination device 210 is activated by known means when the illumination housing 200 is removed from the cut-out section 30. However, the illumination device 210 may be activated by a switch or button.

The magnifying lens 100 is formed from a clear material, such as glass or plastic. Preferably, the magnifying lens 100 is dimensioned to fit snuggly inside the cavity 40 to prevent bending, scratching, or other damage during insertion and retraction from the cavity 40. The magnifying lens 100 may have a convex outer 108 surface facing the outer surface 24 of the bangle 10. An inner surface opposite 106 the convex surface 108 may be either planar or concave. Alternatively, the magnifying lens 100 may be a substantially planar sheet magnifier, such as a Fresnal lens. The magnifying lens 100 is shaped to provide a predetermined amount of magnification. The magnifying lens 100 is interchangeable with additional magnifying lenses providing varying degrees of magnification. Further, the magnifying lens 11 may be interchanged with other objects, such as hidden messages configured to be disposed in the cavity 40.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure. The detailed description is to be construed as exemplary only and does not describe every possible embodiment, as describing every possible embodiment would be impractical, if not impossible.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. A bangle, comprising:
a toroidal main body having an outer main body surface;
a notch formed in the outer main body surface;
a curved cavity formed circumferentially in the main body and extending through at least a part of a circumference defined by the toroidal main body, the cavity opening into the notch;
a magnifying lens inserted into the curved cavity and being movable between a first position in which the magnifying lens is fully inserted into the curved cavity and a second position in which the magnifying lens is pulled-out from the curved cavity; and an illumination housing coupled to an end of the magnifying lens and an illumination device disposed in the illumination housing, the illumination housing having an outer illumination housing surface, wherein the illumination housing is nested in the notch when the magnifying lens is in the first position so that the outer illumination housing surface is substantially flush with the outer main body surface adjacent the notch.

2. The bangle of claim 1, wherein the notch has a first surface aligned substantially relative to the toroidal main body and a second surface perpendicular to the first surface, and facing out on the toroidal main body.

3. The bangle of claim 2, wherein the opening is in the first surface.

4. The bangle of claim 3, wherein the illumination housing has a first surface opposed to the first surface of the notch and a second surface opposed to the second surface of the notch.

5. The bangle of claim 4, wherein the end of the magnifying lens is coupled to the first surface of the illumination housing.

6. The bangle of claim 2, wherein the illumination device projects from the first surface of the illumination housing.

7. The bangle of claim 1, wherein the illumination housing further comprises an inner surface opposite the outer surface and first and second side surfaces extending between the inner and outer surfaces, and the illumination device is fixed in the inner surface of the illumination housing.

8. The bangle of claim 1, wherein the illumination device is an LED light.

9. The bangle of claim 1, further comprising a battery disposed in the illumination housing and configured to provide power to the illumination device.

10. The bangle of claim 1, further comprising a thumb grip formed on the outer surface of the illumination housing for removing the magnifying lens and the illumination housing from the cavity and notch, respectively.

11. The bangle of claim 1, wherein the illumination device is activated when the illumination housing is retracted from the notch.

12. The bangle of claim 1, wherein the main body has an inner surface opposite the outer surface, and first and second side surfaces extending between the inner and outer surfaces.

\* \* \* \* \*